UNITED STATES PATENT OFFICE.

EDGAR L. CULVER, OF SOUTH OMAHA, NEBRASKA.

COMPOSITION OF MATTER TO BE USED AS FUEL AND PROCESS OF MAKING SAME.

No. 851,407.  Specification of Letters Patent.  Patented April 23, 1907.

Application filed August 6, 1906. Serial No. 329,314.

*To all whom it may concern:*

Be it known that I, EDGAR L. CULVER, a citizen of the United States, and residing at South Omaha, Douglas county, State of Nebraska, have invented a new and useful Composition of Matter to be Used as Fuel and Process of Making the Same, of which the following is a specification.

This invention relates to artificial fuel and process of making same, and has especial reference to employment of manure as a principal ingredient and of working it up in a manner so that the offensive odor may be removed, during manipulation, as will be explained.

The invention includes the process of making the fuel as well as the fuel itself.

Raw manure is first gathered and run through chopping and tearing mechanism until it is thoroughly disintegrated, and then passed through an evaporator being thereby entirely dried, and dropped from the evaporator into the mixer, the granules of manure during this movement being substantially enveloped with coal tar as by spraying in a manner so that the manure-granules and coal tar thereafter adhere, the mass, after this treatment having no odor of manure whatever; there is no objection to the use of rotted manure in this connection, but the invention contemplates the use of raw manure, which, as is well known, has no value as a fertilizer, and which may be gathered in large quantities at or near stock-yard centers at very slight expense. Whether raw or rotted manure is used, the combination after the manure-granules have been covered or sprayed with liquid coal tar, is perfectly odorless, unless it be a slight trace of the odor of tar.

The mixer is provided with a receptacle adapted to hold liquids as well as solids, and pulverized hard or soft coal, clay, water, chlorate of potash and saltpetre is then added, the chlorate of potash and saltpetre being dissolved in water before being added. The mixing is very thorough, the amount of water being sufficient to lubricate the clay so that it will be plastic; the coal tar and manure, as well as the pulverized coal become distributed in the plastic mass as well as the dissolved saltpetre and chlorate of potash, by the mixing process. I find it to be of advantage to employ 85 per cent of manure, 5 per cent of coal tar and 10 per cent of pulverized coal, and to use 2 pounds of saltpetre and 4 pounds of chlorate of potash to the ton, but this may be varied by reducing the manure to as low as 30 per cent and increasing the coal to 40 per cent and increasing the coal tar used to 30 per cent, if a more rapid combustion and consequent quicker heat is desired.

Artificial fuel, by employing the above ingredients, and prepared in the manner described has been found to be entirely practical, even when 85 per cent of manure is used. The coal tar entirely removes the odor of the manure from the time they are united and no odor of manure is perceptible when the product is completely formed or when delivered to the consumer, or during combustion. The slight trace of tar odor is not noticeable.

After passing the mixer the combined ingredients are exposed to heat until thoroughly dried, and the product is then ready for use as fuel, but is preferably formed into briquets for the trade, before drying. The water and clay operate as binders, the water being evaporated, as stated, before use. The saltpetre increases the amount of heat derived, and the chlorate of potash causes formation of oxygen-gas which, combining with other gases, renders the combustion more complete; the chlorate of potash and clay also diminishes, during combustion, the amount of smoke given off from use of pulverized coal, this being the result where either soft or hard coal is utilized.

This artificial coal has met with favor for stoves, furnaces, and for producing steam in manufactories, and has a usefulness since it brings into use the valueless item of raw manure, as already explained. For certain uses of this fuel product, the amount of saltpetre and chlorate of potash may be increased to advantage, and I do not limit myself to the exact quantities given.

What I claim as my invention is,—

1. The process as described of making fuel from manure, which consists in drying and disintegrating the manure, unitedly combining the disintegrated parts of manure with coal tar, and thereafter adding pulverized coal, chlorate of potash, saltpetre, water and clay.

2. The process as described of making fuel from manure, which consists in drying and disintegrating the manure, adding a disinfecting agent, and thereafter adding pulverized coal, chlorate of potash, saltpetre, water and clay.

3. The process as described of making fuel from manure, which consists in drying and disintegrating the manure, unitedly combining the disintegrated parts of manure with coal tar, and thereafter adding pulverized coal and a binding agent, and finally forming the mass into briquets.

4. The process as described of making fuel from manure, which consists of disintegrating the manure, adding a disinfecting agent and thereafter adding pulverized coal, chlorate of potash, saltpetre, water and clay.

5. The process as described of making fuel from manure, which consists of disintegrating the manure and using thereof approximately 85 per cent; unitedly combining said manure with approximately 5 per cent of coal tar, and thereafter adding approximately 10 per cent of pulverized coal and a binding agent.

6. The process as described of making fuel from manure, which consists of disintegrating the manure and using thereof approximately 85 per cent; unitedly combining said manure with approximately 5 per cent of coal tar, and thereafter adding approximately 10 per cent of pulverized coal, a binding agent, and forming the ingredients into briquets.

7. The process as described of making fuel from manure, which consists of disintegrating the manure and using thereof approximately 30 per cent; unitedly combining said manure with approximately 30 per cent of coal tar, and thereafter adding approximately 40 per cent of coal, adding a binding agent, and forming the ingredients into briquets.

8. The process as described of making fuel from manure, which consists in unitedly combining approximately 85 per cent of disintegrated manure and approximately 5 per cent of coal tar, and thereafter adding approximately 10 per cent of pulverized coal, and to each ton of said ingredients adding 4 pounds, approximately, of chlorate of potash and 2 pounds, approximately, of saltpetre; adding a binding agent, and forming the ingredients into briquets.

9. The herein described artificial fuel, which consists of manure, coal tar, pulverized coal, chlorate of potash, saltpetre and a binding agent.

10. The herein described artificial fuel, which consists of manure, a disinfecting agent, pulverized coal, chlorate of potash, saltpetre, and a binding agent.

11. The herein described artificial fuel which consists of the following ingredients in substantially the proportions named: dried and disintegrated manure 85 per cent; coal tar 5 per cent, pulverized coal 10 per cent, and a binding agent.

12. The herein described artificial fuel which consists of the following ingredients in substantially the proportions named: dried and disintegrated manure 85 per cent; coal tar 5 per cent, pulverized coal 10 per cent, and to each ton adding 4 pounds of chlorate of potash, 2 pounds of saltpetre, and a binding agent.

In testimony whereof I have hereunto signed my name to this specification in the presence of two subscribing witnesses.

EDGAR L. CULVER.

Witnesses:
HIRAM A. STURGES,
FREDERIC BACON.